United States Patent
Nienhoff et al.

(10) Patent No.: US 10,808,593 B2
(45) Date of Patent: Oct. 20, 2020

(54) EXHAUST GAS TREATMENT FOR AN INTERNAL COMBUSTION ENGINE

(71) Applicant: Continental Automotive GmbH, Hannover (DE)

(72) Inventors: Michael Nienhoff, Regensburg (DE); Paul Rodatz, Landshut (DE); Hong Zhang, Tegernheim (DE); Hao Chen, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 113 days.

(21) Appl. No.: 15/937,625

(22) Filed: Mar. 27, 2018

(65) Prior Publication Data

US 2018/0216514 A1 Aug. 2, 2018

Related U.S. Application Data

(63) Continuation of application No. PCT/EP2016/074180, filed on Oct. 10, 2016.

(30) Foreign Application Priority Data

Oct. 13, 2015 (DE) .................... 10 2015 219 777

(51) Int. Cl.
*F01N 9/00* (2006.01)
*F01N 3/10* (2006.01)
(Continued)

(52) U.S. Cl.
CPC ............. *F01N 9/002* (2013.01); *F01N 3/035* (2013.01); *F01N 3/101* (2013.01); *F02D 41/029* (2013.01);
(Continued)

(58) Field of Classification Search
CPC . F01N 3/035; F01N 3/10; F01N 3/021; F01N 3/022; F01N 3/0222; F01N 3/023;
(Continued)

(56) References Cited

U.S. PATENT DOCUMENTS

2007/0119434 A1* 5/2007 Minegishi ........... F02D 41/0072
123/568.21
2012/0216507 A1 8/2012 Nieuwstadt
(Continued)

FOREIGN PATENT DOCUMENTS

CN 102654071 A 9/2012
DE 102009000410 A1 7/2010
(Continued)

OTHER PUBLICATIONS

JP 2004044457, Machine Translation, Translated on Dec. 3, 2019.*
(Continued)

*Primary Examiner* — Binh Q Tran

(57) ABSTRACT

An internal combustion engine makes available exhaust gas which can be treated by means of a catalytic converter and a particle filter. A method for determining the particle load of the particle filter comprises steps of determining the storage capacity of the catalytic converter for oxygen and determining the particle load of the particle filter on the basis of the determined storage capacity in the controller.

17 Claims, 2 Drawing Sheets

(51) Int. Cl.
*F01N 3/035* (2006.01)
*F02D 41/02* (2006.01)
*F02D 41/14* (2006.01)
*F01N 13/00* (2010.01)

(52) U.S. Cl.
CPC ..... *F02D 41/0235* (2013.01); *F02D 41/1441* (2013.01); *F02D 41/1445* (2013.01); *F02D 41/1446* (2013.01); *F02D 41/1454* (2013.01); *F01N 13/009* (2014.06); *F01N 2560/025* (2013.01); *F01N 2560/06* (2013.01); *F01N 2560/14* (2013.01); *F01N 2900/1404* (2013.01); *F01N 2900/1411* (2013.01); *F01N 2900/1606* (2013.01); *F01N 2900/1624* (2013.01); *F02D 2200/0812* (2013.01); *F02D 2200/0816* (2013.01); *Y02T 10/22* (2013.01); *Y02T 10/47* (2013.01)

(58) Field of Classification Search
CPC ........ F01N 3/08; F01N 3/0814; F01N 3/0821; F01N 3/101; F01N 3/2882; F01N 3/24; F01N 3/0864; F01N 9/002; F01N 2250/02; F01N 11/007; F01N 2560/025; F01N 2570/16; F01N 2900/1624; F01N 2900/0416; F01N 2900/0418; F01N 2900/0421; F01N 2900/0422; F01N 2240/38; F02D 41/14; F02D 41/02; F02D 2200/0814; F02D 2200/0816
See application file for complete search history.

(56) References Cited

U.S. PATENT DOCUMENTS

| | | | |
|---|---|---|---|
| 2013/0192202 | A1 | 8/2013 | Lambert et al. |
| 2014/0109767 | A1* | 4/2014 | Otsuki ............... B01D 46/2418 95/279 |
| 2016/0356673 | A1* | 12/2016 | Taibi ..................... F01N 11/002 |
| 2019/0271249 | A1* | 9/2019 | Nakagoshi ......... B01D 53/9418 |
| 2019/0284977 | A1* | 9/2019 | Kaneko .................. F01N 3/023 |

FOREIGN PATENT DOCUMENTS

| | | |
|---|---|---|
| DE | 102012202658 A1 | 9/2012 |
| DE | 102011106933 A1 | 1/2013 |
| DE | 102006025050 B4 | 4/2014 |
| FR | 2956988 A1 | 9/2011 |
| JP | 2004044457 A * | 2/2004 |
| JP | 4259361 B2 * | 4/2009 |

OTHER PUBLICATIONS

International Search Report and Written Opinion dated Jan. 5, 2017 from corresponding International Patent Application No. PCT/EP2016/074180.
Office Action dated May 31, 2016 from corresponding German Patent Application No. 10 2015 219 777.8.
Chinese Office Action dated Aug. 2, 2019 for corresponding Patent Application No. 201680060135.4.
Korean Office Action dated Jun. 27, 2019 for counterpart Korean patent application 10-2018-7013369.
Korean Notice of Decision Rejection, dated Dec. 18, 2019, for counterpart Korean patent application 10-2018-7013369.

* cited by examiner

EXHAUST GAS TREATMENT FOR AN INTERNAL COMBUSTION ENGINE

CROSS-REFERENCE TO RELATED APPLICATIONS

This application claims the benefit of PCT Application PCT/EP2016/074180, filed Oct. 10, 2016, which claims priority to German Patent Application 10 2015 219 777.8, filed Oct. 13, 2015.

FIELD OF THE INVENTION

The invention relates to the exhaust gas treatment of an internal combustion engine. In particular, the invention relates to a particle filter in the exhaust gas stream of the internal combustion engine.

BACKGROUND OF THE INVENTION

An internal combustion engine, in particular a reciprocating piston engine, which is configured, for example, to drive a motor vehicle, burns a mixture of fuel and oxygen. In this context, an exhaust gas is produced which is treated in a catalytic converter in order to reduce emitted pollutants. In order to be able to operate the catalytic converter efficiently, the oxygen content of the exhaust gas is determined and the internal combustion engine is controlled in such way that a predetermined combustion air ratio (lambda, $\lambda$) is set. In order to purify the exhaust gas even further, a particle filter can additionally be provided which is configured to absorb particles in exhaust gas, mainly soot. Under predetermined conditions, which can comprise, in particular, an increased temperature of the exhaust gas or a specific quantity of remaining residual oxygen in the exhaust gas, the particle filter regenerates, wherein the particles are burnt.

If the internal combustion engine is used, for example, only in the short-term operating mode, the necessary conditions do not occur automatically and regeneration of the particle filter has to be brought about actively by changing the operating point of the internal combustion engine. If the excitation to regeneration fails to occur, when there is a high soot load a spontaneous regeneration can occur during which excessively high temperatures and high temperature gradients can come about in the particle filter. These can melt the filter material or give rise to high mechanical stresses in the filter material. Both effects can damage the filter irreversibly.

SUMMARY OF THE INVENTION

In order to actuate the regeneration of the particle filter, its load with particles is usually determined on the basis of a model, and regeneration is correspondingly brought about before the load exceeds a predetermined value. The model can be determined, for example, on the basis of an engine speed, an engine load or further parameters. However, since the particle load of the particle filter is not measured in this way but instead only tracked, the actual conditions can deviate from the determined conditions. The actual particle emissions of the internal combustion engine can change over its service life or owing to a fault, with the result that a significantly incorrect particle load can be determined.

The object of the present invention is to determine the particle load of an individual particle filter in an improved way. The invention achieves this object by means of the subjects of the claims.

An internal combustion engine makes available exhaust gas which can be treated by means of a catalytic converter and a particle filter. A method for determining the particle load of the particle filter comprises steps of determining the storage capacity of the catalytic converter for oxygen and determining the particle load of the particle filter on the basis of the determined storage capacity.

It has been recognized that the particle load can be determined on the basis of the oxygen storage capacity of the catalytic converter and, if appropriate, of other parameters, for example the temperature of the exhaust gas or its space velocity. The oxygen storage capacity of the catalytic converter is usually determined on a regular basis, for example before or during every driving cycle. This may be necessary in order to diagnose a fault in the region of the catalytic converter or the oxygen sensor (lambda probe). The particle load of the particle filter can therefore be determined with little expenditure and usually without using additional sensors. The determined particle load relates to the individual particle filter which is present, with the result that influences of the aging of the internal combustion engine, of the defect of one of its components, for example an injector, or another fault do not influence the determination accuracy of the method, or only do so to a small degree.

In particular, the method is suitable for use on a spark ignition engine, since here the determination of the particle load on the basis of a differential pressure is, in contrast with a diesel engine, possible only with difficulty, or not at all, owing to the low differential pressures.

In one embodiment, the oxygen storage capacity of the catalytic converter comprises steps of operating, in a first phase, the internal combustion engine with excess fuel in order to reduce, if appropriate, oxygen stored in the catalytic converter, and of operating, in a second phase, the internal combustion engine with excess oxygen in order to permit the storage of oxygen in the catalytic converter, and of determining the storage capacity on the basis of the oxygen contents of the exhaust gas upstream and downstream of the catalytic converter during the second phase. In order to implement these method steps, a first lambda probe upstream of the catalytic converter and a second downstream are essentially sufficient. The determination of the oxygen storage capacity can be carried out easily and quickly.

A computer program product comprises program code means for carrying out the method described when the computer program product runs on a processing device or is stored on a computer-readable data carrier.

A control device for a particle filter for an exhaust gas of an internal combustion engine with a catalytic converter comprises a processing device for determining the particle load of the particle filter on the basis of the storage capacity of the catalytic converter for oxygen, wherein the processing device is configured to bring about regeneration of the particle filter if the determined particle load exceeds a predetermined threshold value.

The processing device can comprise, in particular, a programmable microcomputer which is preferably configured to carry out, for example by means of the computer program product described above, the method which is described further above. The regeneration of the particle filter can be brought about by making available a corresponding message to a control device for the internal combustion engine. In a further embodiment, the control devices for the particle filter and for the internal combustion engine are integrated with one another, with the result that the regeneration of the particle filter can be brought about or actuated directly.

In order to carry out the regeneration of the particle filter, in particular the internal combustion engine can be actuated in such a way that the temperature of the exhaust gas is raised and/or the internal combustion engine is operated with excess oxygen. For this, for example a quantity of injected fuel can be influenced as a function of an air mass which the internal combustion engine takes in. In further embodiments, control times for an inlet valve or outlet valve, an ignition time or another operating parameter of the internal combustion engine can be changed in order to raise the exhaust gas temperature and/or to ensure that the exhaust gas comprises a predetermined quantity of oxygen.

A system for controlling an internal combustion engine comprises a particle filter and a catalytic converter for exhaust gas of the internal combustion engine, a first oxygen sensor (lambda probe) for determining the oxygen content of exhaust gas upstream of the catalytic converter, a second oxygen sensor (lambda probe) for determining the oxygen content of the exhaust gas downstream of the catalytic converter, a first control device for controlling the combustion air ratio of the internal combustion engine as a function of one of the determined oxygen contents, and a second control device such as has been described above.

It is particularly preferred that the catalytic converter and the particle filter are embodied integrated with one another. The catalytic converter preferably comprises a three-way catalytic converter, wherein the term four-way catalytic converter can also be used in combination with the particle filter.

BRIEF DESCRIPTION OF THE FIGURES

The invention will now be described more precisely with reference to the appended figures, in which.

DETAILED DESCRIPTION

Figure 1:
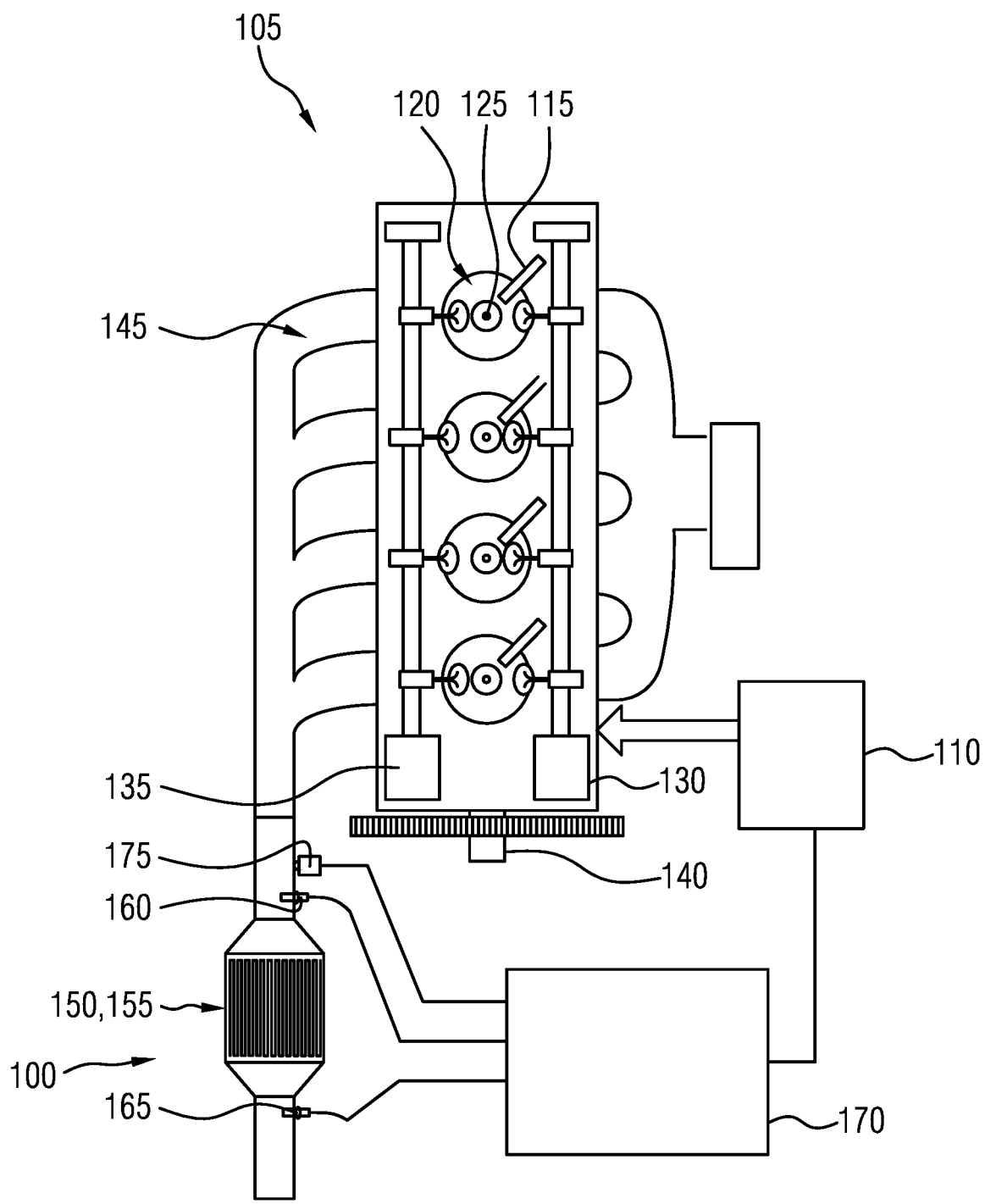
FIG. 1 illustrates schematically a system for controlling an internal combustion engine.

FIG. 1 shows a system 100 for controlling an internal combustion engine 105. The internal combustion engine 105 is preferably configured to drive a motor vehicle and is more preferably embodied as a spark ignition engine. A first control device 110 is configured to control the internal combustion engine 105, in particular an operating point of the internal combustion engine 105. For this purpose, it is possible to influence different components of the internal combustion engine 105, for example an injector 115 for injecting a predetermined quantity of fuel into a combustion chamber 120, an ignition device 125 for igniting a mixture of fuel and oxygen in the combustion chamber 120 at a predetermined time, an inlet adjustment means 130 for influencing an inlet time of air into the combustion chamber 120, an out adjustment means 135 for influencing an outlet time of exhaust gas from the combustion chamber 120 and, if appropriate, other components also. The control can be carried out on the basis of measured values at the internal combustion engine 105, for example a rotational speed of an output shaft 140, a temperature of a component of the internal combustion engine 105, or a mass of air which is let into the internal combustion engine 105 or the internal combustion engine 120.

During the combustion of fuel and oxygen, which is contained in the air which has been let into the combustion chamber 120, an exhaust gas 145 is produced which can be treated and, in particular, purified, by means of the system 100. The system 100 comprises, in particular, a catalytic converter 150, which is preferably embodied as a three-way catalytic converter, and a particle filter 155 which is embodied integrated with the catalytic converter 150 in the illustrated embodiment. In other embodiments, the catalytic converter 150 and the particle filter 155 can also be connected in series, for example with respect to a direction of flow of the exhaust gas 145. The system 100 also comprises a first oxygen sensor 160 upstream of the catalytic converter 150, and a second oxygen sensor 165 downstream of the catalytic converter 150. Furthermore, a second control device 170 is provided which is configured to determine a particle load of the particle filter 155. The particles which have accumulated there are absorbed from the stream of exhaust gas 145 from the internal combustion engine 105. The second control device 170 is preferably connected to one or more sensors and/or to the first control device 110 in such a way that it is provided with a value for the oxygen storage capacity of the catalytic converter 150 and preferably also for the temperature of the exhaust gas 145 or the space velocity of the exhaust gas 145. The temperature can be detected by means of a dedicated temperature sensor 175 which can be mounted at different locations in the exhaust gas conduction system or can be obtained from the first control device 110 which can determine the temperature on the basis of the temperature sensor 175 or by means of the determination on the basis of a model. The space velocity of the flow of exhaust gas 145 is preferably also determined by the first control device 110 and made available to the second control device 110.

The oxygen storage capacity of the catalytic converter 150 is preferably determined in that in a first phase, the internal combustion engine 105 is operated with excess fuel ($\lambda<1$) in order to reduce, if appropriate, oxygen stored in the catalytic converter 150 and in a subsequent second phase, the internal combustion engine 105 is operated with excess oxygen ($\lambda<1$) in order to permit the storage of oxygen in the catalytic converter 150, and the storage capacity of the catalytic converter 150 for oxygen is determined on the basis of the oxygen contents of the exhaust gas 145 upstream and downstream of the catalytic converter 150 during the second phase. These steps can alternatively be carried out by the first control device 110 or the second control device 170, for which purpose the oxygen sensors 160 and 165 are correspondingly connected to the first control device 110 or the second control device 170. It is also preferred that the first control device 110 controls the operating state of the internal combustion engine 105 as a function of at least one of the quantities of oxygen determined by means of the oxygen sensors 160, 165.

The storage of particles from the stream of exhaust gas 145 through the particle filter 155 is a function of the particle load of the particle filter 155 and can additionally be dependent on the temperature and/or on the space velocity of the stream of exhaust gas 145. The second control device 170 is preferably configured to determine the particle load of the particle filter 155 and to compare it with a predetermined threshold value. If the determined load exceeds the threshold value, regeneration of the particle filter 145 can be brought about in that, in particular, the operating point of the internal combustion engine 105 is changed in such a way that the exhaust gas 145 has an increased temperature and/or a predetermined quantity of residual oxygen is located in the stream of exhaust gas 145. The execution of the regeneration can alternatively be controlled by the first control device 110 or the second control device 170. In a particularly preferred embodiment, the control devices 110 and 170 are embodied integrated with one another.

Figure 2:
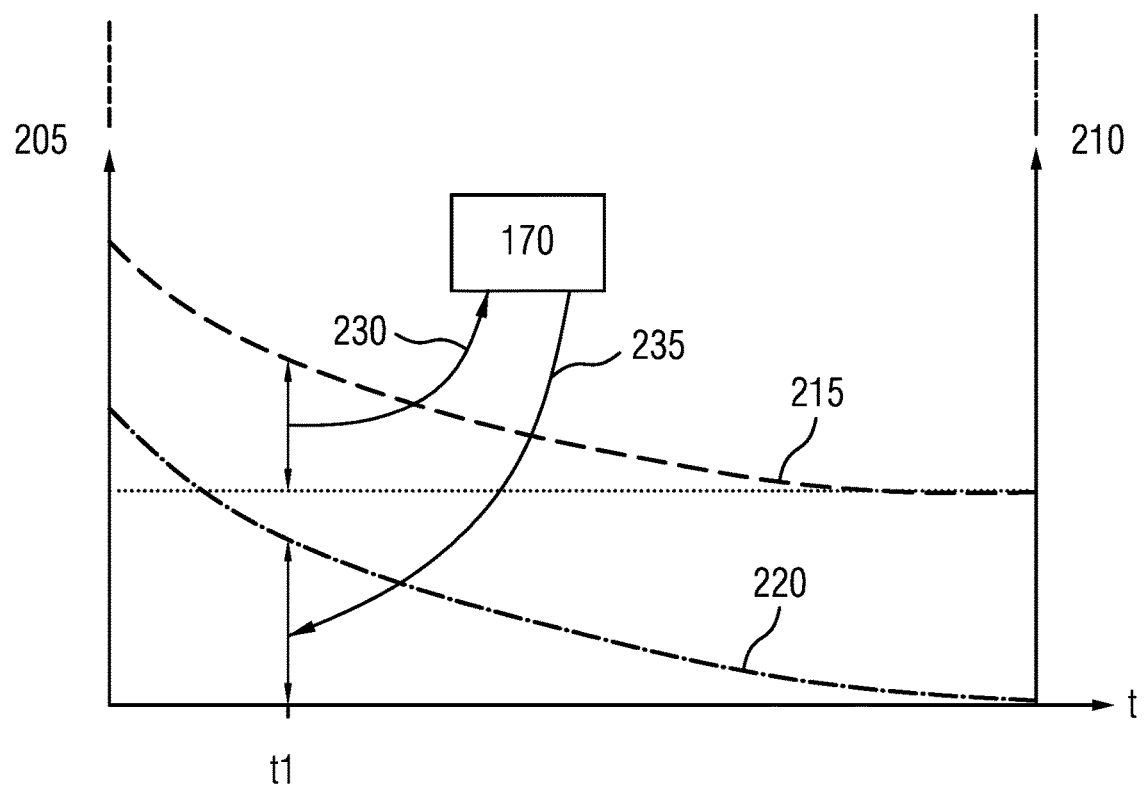
FIG. 2 illustrates schematically a relationship between an oxygen storage capacity of a catalytic converter and a particle load of a particle filter of the system in FIG. 1.

FIG. 2 shows a qualitative relationship between an oxygen storage capacity of the catalytic converter 150 and a particle load of the particle filter 155 of the system 100 in FIG. 1. A time profile is plotted in the horizontal direction. An oxygen storage capacity 205 and a particle load 210 are plotted in the vertical direction, with different ordinate axes. A first profile 215 is illustrated with an interrupted line and relates to the oxygen storage capacity 205 of the catalytic converter 150, and a second profile 220 is illustrated with a dot-dashed line and relates to the profile of the particle load 210 of the particle filter 155. For the sake of better illustration, the profiles 215, 220 in FIG. 2 are plotted offset vertically.

In a method 225, the oxygen storage capacity 205 of the catalytic converter 150 is determined in a first step 230 at a time t1. In addition, the temperature of the exhaust gas 145 and/or its space velocity can also be determined. In a second step 235, the particle load 210 of the particle filter 155 is determined by means of the second control device 170 on the basis of the information acquired in the first step 230. The determination can be carried out, for example, by means of a characteristic diagram, wherein individual values of the characteristic diagram have been determined in advance experimentally or analytically. In another embodiment, the particle load 210 is determined analytically on the basis of the oxygen storage capacity 205 and, if appropriate, the temperature and/or the space velocity of the stream of exhaust gas 145, for example in that a predetermined, if appropriate multi-parameter, function is used. The function can be specified, in particular, in a polynomial fashion. Other embodiments for the determination of the particle load 210 are also possible on the basis of the specified parameters.

LIST OF REFERENCE SYMBOLS

100 System
105 Internal combustion engine
110 First control device
115 Injector
120 Combustion chamber
125 Ignition device
130 Inlet adjustment means
135 Outlet adjustment means
140 Output shaft
150 Catalytic converter
155 Particle filter
160 First oxygen sensor
165 Second oxygen sensor
170 Second control device
175 Temperature sensor
205 Oxygen storage capacity
210 Particle load
215 Profile of the oxygen storage capacity
220 Profile of the particle load
225 Method
230 First step: Determining the oxygen storage capacity
235 Second step: Determining the particle load

The invention claimed is:

1. A method for a particle filter for an exhaust gas of an internal combustion engine with a catalytic converter, the method comprising:
   determining a storage capacity of the catalytic converter for oxygen; and
   determining the particle load of the particle filter on the basis of the determined storage capacity,
   wherein the determination of the storage capacity of the catalytic converter for oxygen comprises:
      operating, in a first phase, the internal combustion engine with excess fuel relative to an amount of oxygen in order to reduce oxygen stored in the catalytic converter;
      following operating in the first phase, operating, in a second phase, the internal combustion engine with excess oxygen relative to an amount of fuel in order to permit the storage of oxygen in the catalytic converter;
      sensing oxygen contents of the exhaust gas upstream and downstream of the catalytic converter during the second phase; and
      determining the storage capacity on the basis of the oxygen contents of the exhaust gas sensed upstream and downstream of the catalytic converter during the second phase.

2. The method of claim 1, wherein the internal combustion engine is a spark ignition engine.

3. A control device for a particle filter for an exhaust gas of an internal combustion engine with a catalytic converter, wherein the control device comprises:
   a processing device for determining the particle load of the particle filter on the basis of the storage capacity of the catalytic converter for oxygen;
   wherein the processing device is configured to bring about regeneration of the particle filter if the determined particle load exceeds a predetermined threshold value,
   wherein the processing device is configured to determine the storage capacity of the catalytic converter for oxygen by
   operating, in a first phase, the internal combustion engine with excess fuel in order to reduce, if appropriate, oxygen stored in the catalytic converter;
   following operating in the first phase, operating, in a second phase, the internal combustion engine with excess oxygen in order to permit the storage of oxygen in the catalytic converter;
   sensing oxygen contents of the exhaust gas upstream and downstream of the catalytic converter during the second phase; and
   determining the storage capacity on the basis of the oxygen contents of the exhaust gas upstream and downstream of the catalytic converter during the second phase.

4. The control device of claim 3, wherein the regeneration comprises actuating the internal combustion engine in order to raise a temperature of the exhaust gas and to operate the internal combustion engine with excess oxygen.

5. A system for controlling an internal combustion engine, the system comprising:
   a particle filter and a catalytic converter for exhaust gas of the internal combustion engine;
   a first oxygen sensor for determining the oxygen content of the exhaust gas upstream of the catalytic converter;
   a second oxygen sensor for determining the oxygen content of the exhaust gas downstream of the catalytic converter;

a first control device having a processing device configured to control combustion air ratio of the internal combustion engine as a function of one of the determined oxygen contents; and a second control device having a processing device configured to determine a particle load of the particle filter based upon a storage capacity of the catalytic converter, and to bring about regeneration of the particle filter if the determined particle load exceeds a predetermined threshold value, wherein the second control device is configured to determine the storage capacity of the catalytic converter for oxygen by operating, in a first phase, the internal combustion engine with excess fuel in order to reduce, if appropriate, oxygen stored in the catalytic converter;

subsequent to operating in the first phase, operating, in a second phase, the internal combustion engine with excess oxygen in order to permit the storage of oxygen in the catalytic converter; and determining the storage capacity on the basis of the oxygen contents of the exhaust gas upstream and downstream of the catalytic converter during the second phase.

6. The system as claimed in claim 5, wherein the catalytic converter and the particle filter are embodied integrated with one another.

7. The method as claimed in claim 1, further comprising bringing about regeneration of the particle filter if the determined particle load exceeds a predetermined threshold value.

8. The method as claimed in claim 7, wherein regeneration of the particle filter comprises actuating the internal combustion engine in order to raise the temperature of the exhaust gas and to operate the internal combustion engine with excess oxygen.

9. The method as claimed in claim 1, wherein the particle load is determined based on a temperature of the exhaust gas.

10. The method as claimed in claim 1, further comprising receiving a sensed oxygen content of the exhaust gas upstream of the catalytic converter, receiving a sensed oxygen content of the exhaust gas downstream of the catalytic converter, and controlling a combustion air ratio of the internal combustion engine as a function of one of the sensed oxygen content.

11. The method as claimed in claim 1, wherein the particle load is determined based upon a space velocity of the exhaust gas.

12. The control device as claimed in claim 3, wherein the processing device is configured to determine the particle load of the particle filter based upon a temperature of the exhaust gas.

13. The control device as claimed in claim 3, wherein the processing device is configured to determine the particle load of the particle filter based upon a space velocity of the exhaust gas.

14. The control device as claimed in claim 3, wherein the processing device receives a sensed oxygen content of the exhaust gas upstream of the catalytic converter and a sensed oxygen content of the exhaust gas downstream of the catalytic converter, and controls a combustion air ratio of the internal combustion engine as a function of one of the sensed oxygen content.

15. The system as claimed in claim 5, wherein regeneration of the particle filter comprises actuating the internal combustion engine in order to raise a temperature of the exhaust gas and to operate the internal combustion engine with excess oxygen.

16. The system as claimed in claim 5, wherein the second control device is configured to determine the particle load of the particle filter based upon a temperature of the exhaust gas.

17. The system as claimed in claim 5, wherein the second control device is configured to determine the particle load of the particle filter based upon a space velocity of the exhaust gas.

* * * * *